Oct. 2, 1923.

H. SLETTO

VEGETABLE AND FRUIT PEELING DEVICE

Filed April 23, 1923   2 Sheets-Sheet 2

1,469,650

INVENTOR.
HENRY SLETTO
BY Victor J Evans
ATTORNEYS.

Patented Oct. 2, 1923.

1,469,650

UNITED STATES PATENT OFFICE.

HENRY SLETTO, OF TEMPLETON, CALIFORNIA.

VEGETABLE AND FRUIT PEELING DEVICE.

Application filed April 23, 1923. Serial No. 634,121.

*To all whom it may concern:*

Be it known that I, HENRY SLETTO, a citizen of the United States, residing at Templeton, in the county of San Luis Obispo and State of California, have invented new and useful Improvements in Vegetable and Fruit Peeling Devices, of which the following is a specification.

This invention relates to improvements in vegetable and fruit peeling devices.

The principal object of this invention is to peel the skin from a vegetable or fruit, such as citron, watermelon, pumpkins and the like, and to further divide the meat of the vegetable or fruit by slicing the same into strips of a predetermined width and thickness.

A still further object is to provide novel means for retaining and rotating the vegetable during the peeling operation.

A still further object is to provide automatic means whereby the machine will automatically accommodate itself to vegetables of different sizes and shapes.

Another object is to provide a device of this character which is simple in construction, and one which will occupy a minimum amount of space.

Other objects and advantages will be apparent during the course of the following description.

Figure 1:
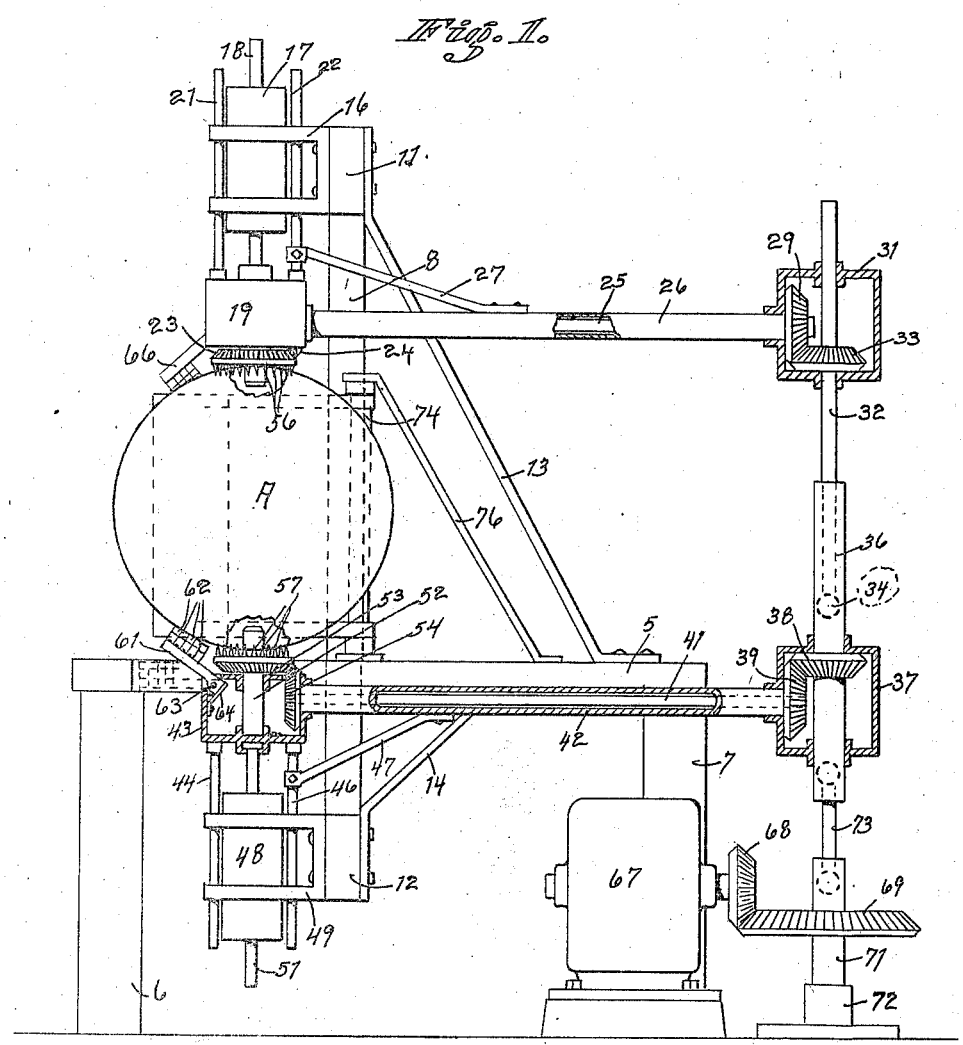
Figure 2:
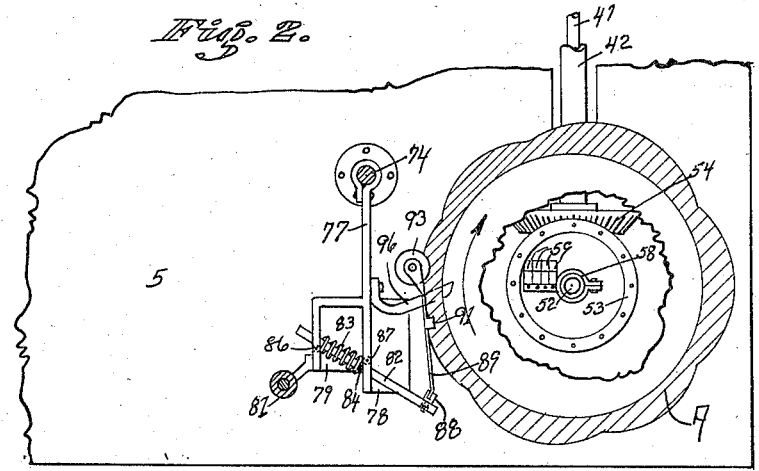
Figure 3:
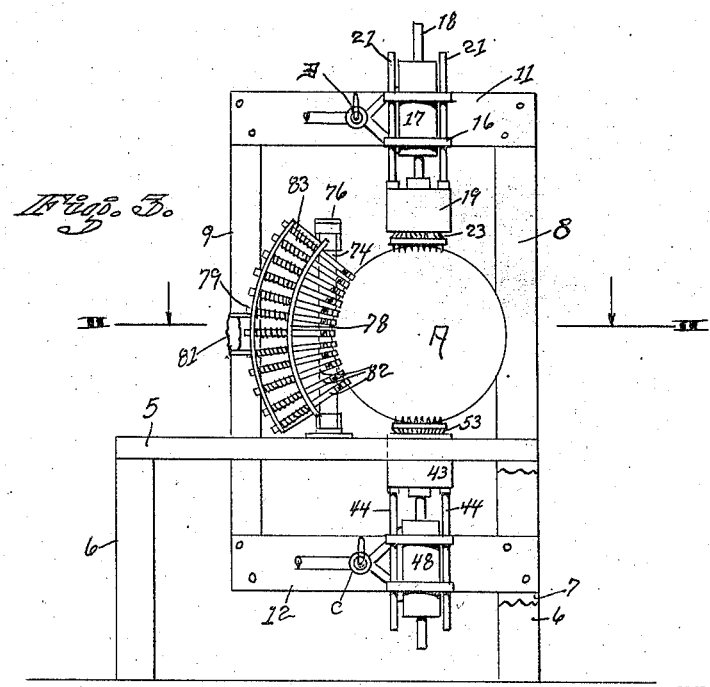

In the accompanying drawings forming a part of this specification, and in which like numerals are employed to designate like parts throughout the same, Figure 1 is a side elevation of my improved device, shown partly in cross section, in order to better illustrate the working parts thereof, Figure 2 is a fragmentary detail cross section taken on the line 2—2 of Figure 3, Figure 3 is a front elevation of my device, Figure 4 is a fragmentary detail view of one of the paring knives and cutting wheels, Figure 5 is a similar view to Figure 4 taken at right angles to that of Figure 4.

It is a tedious operation to pare large vegetables, such as pumpkins, watermelons and the like, owing to their size and the toughness of the skin. I have therefore provided a device which will readily grasp a vegetable, such as a pumpkin or a fruit such as a watermelon and which will entirely remove the skin therefrom, at the same time dividing the peeling as it is removed. In the case of a watermelon, the rind or skin thus removed may be used for the purpose of making pickles or like products.

In the accompanying drawings wherein for the purpose of illustration is shown a preferred embodiment of my invention, the numeral 5 designates a table supported as by legs 6 and 7. To the table thus formed is secured a framework consisting of uprights 8 and 9, joined at a point above the table by a cross piece 11 and joined at a point below the table as by a cross piece 12.

Suitable braces are employed to steady this frame as shown at 13 and 14. Mounted upon the cross piece 11 is a bracket 16 supporting an air cylinder 17 having a piston therein, which piston is connected to a rod 18. This rod extends downwardly and is secured to a housing 19 which is vertically guided in the frame 16 as by rods 21 and 22. This housing serves to support a shaft having a bevel gear 23 secured thereto, which gear meshes with a bevel gear 24 secured to a shaft 25 and rotatable in a sleeve 26, which sleeve is rigidly held to the casing 19 by a brace 27 (see Fig. 1).

A bevel gear 29 is secured to the shaft 25 and is surrounded by a casing 31. This casing serves to journal a vertical shaft 32 and has a gear 33 secured thereto, which gear is adapted to mesh with the gear 29. The lower extremity of the shaft 22 is provided with a ball head 34 having teeth thereon, which teeth in turn engage radially disposed internal teeth formed within a tubular member 36. This tubular member is journaled in a housing 37, which housing encloses bevel gears 38 and 39, the bevel gear 38 being secured to the tubular member 36, while the bevel gear 39 is secured to the shaft 41 and rotatable in a sleeve 42, which sleeve is secured to the housing 37 and has its opposite end secured to a housing 43. This housing is provided with downwardly extending guide members 44 and 46.

A brace 47 extends between the sleeve 42 and the guide 46, for the purpose of maintaining proper alignment between the connecting parts.

An air cylinder 48 is rigidly mounted in a frame 49, which is secured to the cross piece 12. A piston is located in this air cylinder and has a rod 51 secured thereto. This rod is connected to the housing 43, for the purpose of controlling the movement thereof.

A shaft 52 is positioned in the housing 43 and carries a bevel gear 53, which bevel gear in turn meshes with a bevel gear 54 secured to the end of the shaft 41. It will be noted that the gears 23 and 53 are each provided with pointed teeth as shown at 56 and 57 respectively. These teeth project toward each other.

The shafts upon which the gears 23 and 53 are located are held against rotation and a collar 58 serves to secure a plurality of paring knives 59 radially disposed relative thereto at a point within the circle formed by the teeth 57 (see Fig. 2). At 61 I have shown an arm having a plurality of paring knives 62. This arm is pivoted at 63 and held in an adjusted position through the medium of a spring 64. A similar arm is pivoted to the casing 19 as indicated by the numeral 66.

A motor 67 is mounted beneath the table 5 and has a bevel gear 68 secured to its shaft, which gear meshes with a bevel gear 69 secured to a vertical shaft 71 mounted in a bearing 72.

A link 73 serves to connect the shaft 71 and the tubular member 36. The construction of this link is such as to allow a limited amount of movement between the respective shafts.

At 74 I have shown a standard braced as shown at 76 to which standard is secured a swinging frame 77. This frame has at its forward end curved sections 78 and 79. A handle 81 is provided for swinging this frame about the standard 74. I have provided a plurality of inclined rods 82, which rods extend through the curved sections as best shown in Figures 2 and 3 and have a spring 83 coiled thereon. At a point between these curved members, a pin 84 contacts one end of the spring while the opposite end of the spring contacts the curved portion 79.

At 86 and 87 I have shown rollers for the purpose of preventing friction of the rods 82, during their movement as will be later seen. Supported upon the outer end of each of these rods 82 is a swivel 88 having a limited movement. To this swivel is connected a spring knife carrier 89 having a knife 91 riveted or otherwise secured thereto. The end of this knife carrying member is bent at right angles as shown at 92 and carries a cutter wheel 93 pivoted thereto. This cutter wheel also has a series of radially disposed cutters 94 formed thereon.

The letter A in the several views refers to a pumpkin or other like vegetable positioned within my machine.

At 96 is shown a halving knife which is secured at a point midway of the length of the curved portion 78.

The operation of my device is as follow:—

Air is admitted to the cylinders 17 and 48 through the valves indicated at B and C, which air causes the teeth 56 and 57 to be moved as far away from each other as possible. A vegetable such as a pumpkin is then placed therebetween and the valves again manipulated so as to cause the air in the cylinders to move the pistons in an opposite direction, thus bringing the teeth 56 and 57 into contact with the end of the vegetable. The motor 67 is now started which causes rotary motion to be transmitted through the gears 68 and 69 to the shaft 71, links 72, tubular member 36 and shaft 32. This motion is in turn transmitted to the shafts 25 and 41, through the medium of the gears 29—33 and 38—39 respectively. As these shafts revolve, rotary motion is transmitted to the gears 23 and 53 through the medium of the gears 24 and 54, secured to the shafts 25 and 41 respectively, with the result that the pumpkin will rotate in the direction of the arrow in Figure 2.

The paring blades 59 will now contact the lower portion of the pumpkin and will pare the same while the blades 62 will be swung from their dotted line position of Figure 1, so as to pare the portion of the pumpkin adjacent the outer periphery of the gears 23 and 53. The operator now grasps the handle 81 and swings the frame 77 toward the pumpkin bringing it into contact with the sides thereof. The spring knife carriers 89 will automatically adjust themselves to conform to the surface of the vegetable being pared due to the swivel action 88. At the same time the cutter wheel 93 will cut into the skin of the vegetable and at the same time the cutters 94 will make vertical cuts, thus cutting the peeled portion into small sections.

The pumpkin or vegetable being operated upon, after making one complete revolution, may be removed wholly pared and cut in half ready for further handling processes usual in the preparing of such vegetables.

It is my intension to use two center sections, one on each side, one to peel the skin off and the other to slice big slices and cut them into sections. In this case the peeling springs 59 may be eliminated and more teeth set in to grip the vegetable or fruit.

It will thus be seen that I have provided a machine which will perform all of the functions set forth in the above objects, and one which will operate with a minimum amount of loss in time, labor and waste of the vegetable.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described my invention, I claim:—

1. In a device of the character described, a table, a support extending below and above said table, vegetable engaging means supported from the extremity of said supports, means for moving said vegetable engaging means to and away from each other, a standard mounted on said table, a frame pivoted to said standard, said frame having curved portions, a plurality of rods slidably mounted in said curved portions each of said rods having a spring knife carrier movably secured to one end thereof, a knife mounted on each of said carriers and a cutter wheel mounted on the free end of said carrier.

2. In a device of the character described, means for supporting and rotating the vegetable to be pared, a standard positioned adjacent said vegetable holding and rotating means, a swinging frame secured to said standard, curved sections formed on said frame, a plurality of radially disposed rods movable in said curved portions, a spring coiled about each of said rods at a point between each of said curved portions, a retaining pin extending through each of said rods and adapted to contact one end of said spring, a spring knife carrier mounted at the free end of each of said rods, a knife secured to said carrier, a cutter wheel pivoted at the free end of said carrier, said cutter wheel comprising a disc and radially disposed cutters secured thereto, substantially as and for the purpose specified.

3. In a device of the character described, means for positioning and rotating a vegetable to be pared, a plurality of cutting knives adapted to be brought into contact with the periphery of the vegetable being pared, said knives being freely mounted so as to conform to the contour of the vegetable being pared, and a cutter wheel associated with said knives for the purpose of providing horizontal cuts around said vegetable and radially disposed blades on said cutter wheel for the purpose of providing vertical cuts on the vegetable being pared.

In testimony whereof I affix my signature.

HENRY SLETTO.